United States Patent
Tlich et al.

(10) Patent No.: US 8,406,317 B2
(45) Date of Patent: Mar. 26, 2013

(54) DEVICE AND A METHOD FOR ADJUSTING POWER SPECTRAL DENSITIES OF A PLURALITY OF TELECOMMUNICATIONS LINES

(75) Inventors: Mohamed Tlich, Lannion (FR); Fabienne Moulin, Perros Guirec (FR); Ahmed Zeddam, Perros Guirec (FR)

(73) Assignee: France Telecom, Paris (FR)

( * ) Notice: Subject to any disclaimer, the term of this patent is extended or adjusted under 35 U.S.C. 154(b) by 1587 days.

(21) Appl. No.: 11/664,940

(22) PCT Filed: Oct. 4, 2005

(86) PCT No.: PCT/FR2005/002436
§ 371 (c)(1),
(2), (4) Date: Jun. 20, 2007

(87) PCT Pub. No.: WO2006/040435
PCT Pub. Date: Apr. 20, 2006

(65) Prior Publication Data
US 2009/0010421 A1 Jan. 8, 2009

(30) Foreign Application Priority Data
Oct. 7, 2004 (FR) ...................................... 04 10599

(51) Int. Cl.
*H04L 27/28* (2006.01)
(52) U.S. Cl. ........................................ 375/260; 379/413
(58) Field of Classification Search .................. 375/222, 375/225, 227
See application file for complete search history.

(56) References Cited

U.S. PATENT DOCUMENTS

| | | | |
|---|---|---|---|
| 6,061,427 A | 5/2000 | Ryoo | |
| 6,084,906 A * | 7/2000 | Kao et al. | 375/220 |
| 6,636,603 B1 | 10/2003 | Milbrandt | |
| 6,647,058 B1 * | 11/2003 | Bremer et al. | 375/222 |
| 7,139,323 B2 * | 11/2006 | Erving et al. | 375/260 |
| 7,161,916 B2 * | 1/2007 | Malladi et al. | 370/332 |
| 7,236,451 B2 * | 6/2007 | De Francesco et al. | 370/208 |
| 7,356,049 B1 * | 4/2008 | Rezvani | 370/484 |
| 7,558,315 B2 * | 7/2009 | Cioffi et al. | 375/222 |
| 2004/0120411 A1 * | 6/2004 | Walton et al. | 375/260 |
| 2006/0014528 A9 * | 1/2006 | Hsu et al. | 455/414.1 |

OTHER PUBLICATIONS

S. Kourtis, "Optimum bit allocation algorithm for DMT-based systems under minimum transmitted power constraint," Electronic Letters, vol. 35, No. 25, pp. 2181-2182, Dec. 9, 1999.

* cited by examiner

*Primary Examiner* — David C. Payne
*Assistant Examiner* — Bahman Badipour
(74) *Attorney, Agent, or Firm* — Knobbe Martens Olson & Bear LLC

(57) ABSTRACT

The invention relates in particular to a method of adjusting power spectral densities of a plurality of telecommunications lines sending data in a plurality of frequency sub-bands, a power spectral density being assigned to each sub band sending data. The method comprises the following steps: selecting at least one line, called the donor line, whose capacity for sending data is higher than a predetermined reference capacity, selecting at least one sub band of said donor line, and reducing the power spectral density assigned to the selected sub band to a predefined minimum power level in said sub band.

12 Claims, 3 Drawing Sheets

DEVICE AND A METHOD FOR ADJUSTING POWER SPECTRAL DENSITIES OF A PLURALITY OF TELECOMMUNICATIONS LINES

The present invention relates to a method of adjusting power spectral densities of a plurality of telecommunications lines sending data in a plurality of frequency sub-bands, a spectral power density being assigned to each sub-band of each line sending data.

The invention also relates to a device for implementing this method.

BACKGROUND OF THE INVENTION

Methods of adjusting power spectral densities of telecommunications lines sending data are known, in particular for managing xDSL-type lines. As a general rule, a single adjustment device connected to the sender modem of each line is used to adjust certain parameters of each of the lines independently. For example, it is possible to set a required bit rate, a required minimum noise margin, the spectral power density, or parameters relating to error correction techniques.

The lines may have subscriptions to heterogeneous services that do not all require the same bit rate.

If the parameters of a line are insufficient to provide a service to which that line has a subscription, the adjustment device is used to adjust them to provide the service within the limit of the overall capacity of all the lines.

The parameters of a line are usually adjusted at the time of initializing a service on that line.

When the overall capacity is reached, some lines can no longer subscribe to a service, while others might have effective noise margins or effective bit rates that are much greater than the noise margins and bit rates required for the services to which they subscribe. The management of the xDSL lines as a whole is therefore less than the optimum.

BRIEF SUMMARY OF THE INVENTION

The invention aims to remedy this drawback by providing a method of adjusting a plurality of telecommunications lines sending data that improves the management of all the lines to which the adjustment device is connected.

Thus the invention consists in a method of adjusting the spectral power densities of a plurality of telecommunications lines sending data in a plurality of frequency sub-bands, a spectral power density being assigned to each sub-band of each line sending data, characterized in that:
  at least one "donor line" is selected having capacity to send data that is greater than a predetermined reference capacity;
  at least one sub-band of that donor line is selected; and
  the spectral power density assigned to the selected sub-band is reduced to a predefined minimum power level in that sub-band.

The invention exploits the fact that reducing the spectral power density assigned to a sub-band of a line reduces stationary crosstalk noise induced by that sub-band on other lines of the set. This noise reduction automatically increases the capacity of those other lines to send data.

Accordingly, selecting one or more lines having capacity to send data that is greater than a predetermined reference capacity and reducing the spectral power density of the selected line by extinguishing one or more of its sub-bands (i.e. reducing the spectral power density assigned to that sub-band to a predefined minimum power level in that sub-band), serves to increase the capacities of the other lines without increasing the total spectral power density assigned to all the lines.

In one particular implementation of the method described above:
  a "recipient line" is selected having capacity to send data that is less than a predetermined reference capacity called the "recipient capacity";
  at least one sub-band of that recipient line is selected in accordance with a predetermined criterion; and
  the selection of the sub-band of the recipient line determines the selection of the sub-band of the donor line.

The predetermined criterion for selecting the sub-band of the recipient line is preferably a level of crosstalk coupling between the lines in each sub-band of the selected recipient line.

This criterion is particularly beneficial since it enables selection of frequency sub-bands whose extinction has the greatest effect on the other lines in terms of stationary noise reduction.

Alternatively, the predetermined criterion may be a normalized signal-to-noise ratio in each sub-band of the selected recipient line.

In one particular implementation the recipient capacity is a minimum bit rate required to provide at least one service to which the recipient line subscribes and/or the donor capacity is equal to the maximum of the sum of a minimum bit rate required to provide at least one service to which the recipient line subscribes with a predetermined bit rate margin plus a minimum bit rate guaranteed by the operator.

In another implementation the capacity to send data is a maximum data bit rate that a line can send with the spectral power density assigned to it, and the recipient capacity is a predetermined reference bit rate.

This implementation is particularly advantageous when sending data over lines for which the bit rate allocation method is of the rate adaptive (RA) type. In this type of sending, the instantaneous bit rate output by a line is equal to the maximum data bit rate that the line can send. Accordingly, it is then easy to measure the maximum bit rate of data that the line can send, since it is the bit rate that is actually sent.

More precisely, an adjustment method of the invention may include the following steps:
  a first group of recipient lines is selected;
  the recipient lines of the selected first group are classified; and
  for at least some of the recipient lines of the selected group, processed in the order of classification:
    a batch comprising at least one sub-band of the recipient line is selected in accordance with a predetermined criterion;
    at least one "batch to be extinguished" comprising at least one sub-band of at least one donor line is selected, the selection of the batch of the recipient line determining the selection of the batch to be extinguished;
    for the selected batch of the recipient line, at least one donor line is selected for which the spectral power density assigned to the sub-band of the batch to be extinguished is greater than the predetermined level; and
    for each selected donor line, the spectral power density of the sub-band of the batch to be extinguished is reduced to the predefined minimum power level in that sub-band.

At most a predetermined number of donor lines is optionally selected for the selected batch of the recipient line.

Selecting too great a number of donor lines for the selected batch of the recipient line may prove useless. The selection of donor lines beyond the predetermined number does not necessarily result in a significant increase in the capacity of the recipient line to send data because, according to certain standards, a maximum number of bits per sub-band may not be exceeded.

A method according to the invention may further have one or more of the following features:

before selecting at least one sub-band of the recipient line in accordance with a predetermined criterion:
the following two conditions are verified:
if the recipient line was a donor line during a preceding execution of the adjustment method; and
if so, if the spectral power density assigned to at least one sub-band was reduced to the predefined minimum power level in that sub-band during that previous execution of the adjustment method;
if these two conditions are satisfied, the spectral power density in that sub-band is re-established at the initial power level before reduction;
the data being sent by a sender terminal and received by a receiver terminal, to re-establish the spectral power density in the sub-band:
an activation message is sent from the sender terminal to the receiver terminal;
the reception of that activation message by the receiver terminal causes the sending of a message requesting modification of the sent spectral power density in the sub-band from the receiver terminal to the sender terminal; and
the sender terminal re-establishes the spectral power density in the sub-band in accordance with the instructions contained in the message sent by the receiver terminal;
the data being sent by a sender terminal and received by a receiver terminal, the sender terminal re-establishes the spectral power density level without being prompted by the receiver terminal.

The invention finally consists in a device for adjusting spectral power densities of a plurality of telecommunications lines sending data in a plurality of frequency sub-bands, a spectral power density being assigned to each sub-band of each line sending data, characterized in that it includes:

means for selecting at least one "donor line" whose capacity for sending data is greater than a predetermined reference capacity;
means for selecting at least one sub-band of that donor line; and
means for reducing the spectral power density assigned to the selected sub-band to a predefined minimum power level in that sub-band.

The invention can be better understood with the assistance of the following description, given by way of example only and with reference to the appended drawings, in which:

DETAILED DESCRIPTION OF THE INVENTION

Figure 1:
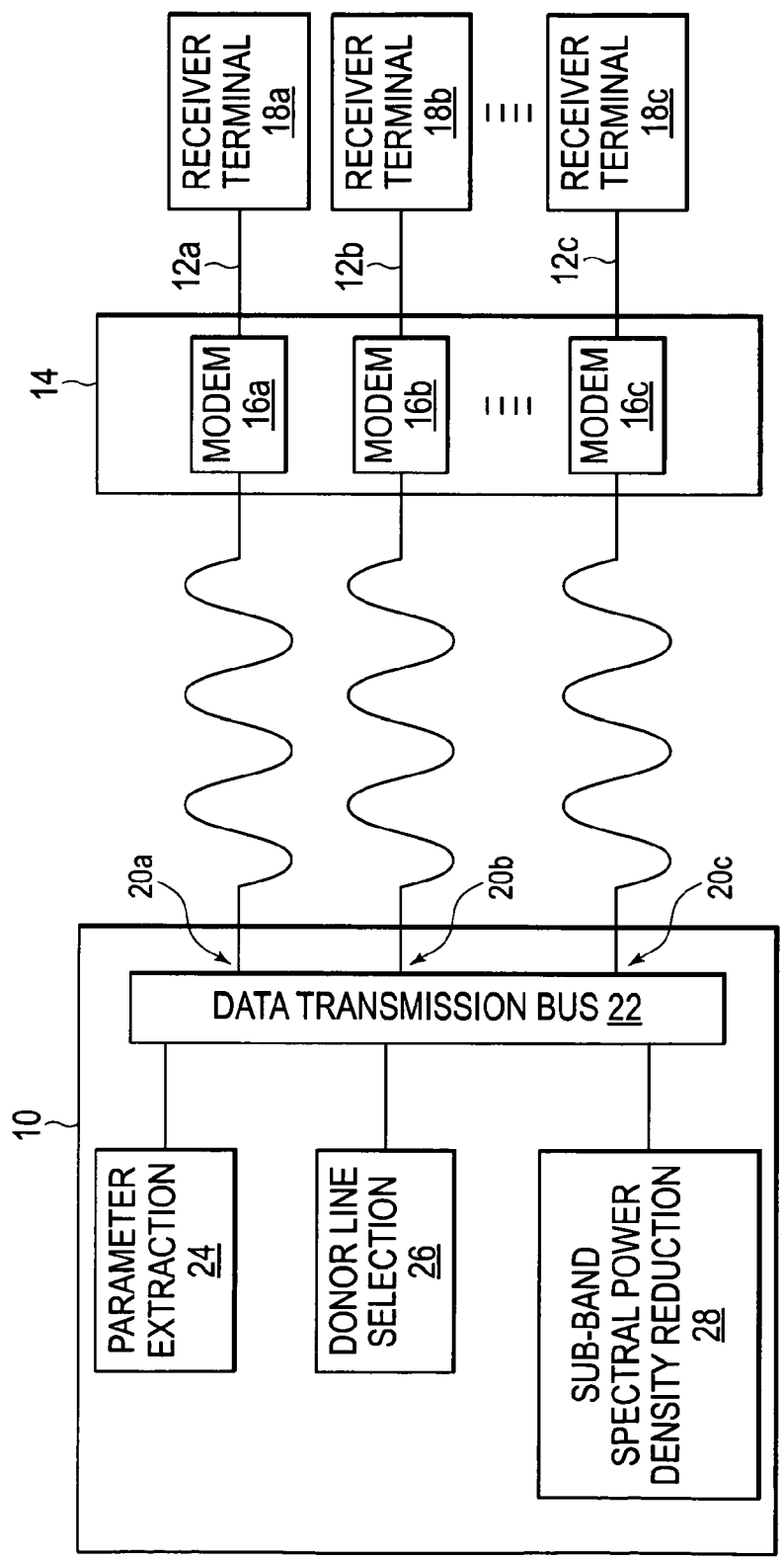
FIG. 1 represents diagrammatically the general structure of an embodiment of an adjustment device according to the invention.

The adjustment device 10 represented in FIG. 1 adjusts the spectral power densities of a plurality of telecommunications lines $12a$, $12b$, ..., $12c$ adapted to send data. These are xDSL-type lines, for example, for transmitting high bit rate signals.

Each line $12a$, $12b$, ..., $12c$ is associated with a sender modem $16a$, $16b$, ..., $16c$. The sender modems $16a$, $16b$, ..., $16c$ are housed in the same telephone central office 14 and are all connected to the adjustment device 10.

Each line $12a$, $12b$, ..., $12c$ is also connected to a receiver terminal $18a$, $18b$, ..., $18c$.

The adjustment device 10 includes connection means $20a$, $20b$, ..., $20c$ to the lines $12a$, $12b$, ..., $12c$. These connection means $20a$, $20b$, ..., $20c$ are connected to a data transmission bus 22 of the adjustment device 10.

The adjustment device 10 further includes means 24 for extracting parameters specific to the lines $12a$, $12b$, ..., $12c$ to which it is connected. Those parameters specific to the lines $12a$, $12b$, ..., $12c$ are, for example, the required bit rate, the required minimum noise margin, the bit rate actually sent, the spectral power density or parameters relating to error correction techniques.

The parameter extraction means 24 are connected to the transmission bus 22. They can be activated at any time, even during a call on one or more of the lines $12a$, $12b$, ..., $12c$.

The adjustment device 10 also includes means 26 for selecting at least one line, referred to as the "donor line", having capacity to send data that is greater than a predetermined reference capacity. These selection means 26 are also adapted to select at least one sub-band of this donor line.

In the example described, the capacity to send data is a maximum data bit rate that a line $12a$, $12b$, ..., $12c$ can send with the spectral power density assigned to it, and the predetermined reference capacity is a bit rate equal to the maximum of the sum of a minimum bit rate required to provide at least one service to which a line $12a$, $12b$, ..., $12c$ has a subscription with a predetermined bit rate margin plus a minimum bit rate guaranteed by the operator.

The adjustment device 10 finally includes means 28 for reducing the spectral power density assigned to the selected sub-band of the selected donor line to a predefined minimum spectral power density level in that sub-band. This reduction of its spectral power density is what is referred to herein as "extinguishing" the sub-band.

Note that the number of sub-bands of the donor line selected, and destined to be extinguished, must be such that the effective bit rate on this line remains above the required minimum bit rate, even after the spectral power density is reduced by the adjustment device 10. Adding the predetermined bit rate margin to the required minimum bit rate guarantees that this requirement is satisfied.

One function of the adjustment device 10 is to optimize the spectral power density assigned to each of the lines $12a$, $12b$, ..., $12c$ as a function of the services to which each of those lines has a subscription and the resources available for all the lines.

The adjustment device 10 operates in accordance with a method that is described with reference to FIG. 2.

During a first or initialization step 30, there is determined for each line $12a$, $12b$, ..., $12c$ a minimum bit rate required to provide the service(s) to which that line 12a, 12b, ..., 12c has a subscription and that a client wishes to obtain.

During this initialization step 30, two reference capacities called the "donor capacity" and the "recipient capacity" are also determined for each line 12a, 12b, 12c, the recipient capacity being equal to the required nominal bit rate and the donor capacity being equal to the maximum of the sum of the minimum bit rate required with the predetermined bit rate margin plus a minimum bit rate guaranteed by the operator.

At the end of the initialization step 30, each line 12a, 12b, ..., 12c has access to a maximum data bit rate that it can send with the spectral power density assigned to it. That maximum bit rate constitutes a capacity of the line 12a, 12b, ..., 12c to send data.

There follows a step 32 of selecting donor lines and recipient lines. During this selection step 32, a first group of lines called "recipient lines" is selected having capacity to send data that is less than the recipient capacity. A second group of lines called "donor lines" is also selected having capacity to send data that is greater than the donor capacity.

A step 33 then verifies, for each recipient line of the first group, whether the following two conditions are satisfied:
 if it was part of the second group of donor lines during a preceding execution of the adjustment method; and
 if so, if at least one of its sub-bands was extinguished on that occasion by the reduction means 28.

If these two conditions are satisfied, the initial spectral power density level of the extinguished sub-bands of that recipient line before their extinction is re-established. There are two ways to do this:
 using a modification method that is described with reference to FIG. 3; or
 by re-establishing the spectral power density level at the initiative of the sender associated with that recipient line (i.e. the sender terminal re-establishes the spectral power density level without being prompted by the corresponding receiver terminal), without necessarily advising the corresponding receiver terminal.

If either or both of these two conditions is not satisfied or if, after the initial spectral power density level of the extinguished sub-bands has been re-established, that line still has a capacity for sending data less than the recipient capacity, the line is retained in the first group. If not, this line is withdrawn from the first group of recipient lines.

If one of the groups is empty, the selection step 32 is repeated until each of the groups includes at least one line. The adjustment method used by the device 10 requires at least one donor line to be in a position to reduce its capacity to send data to enable at least one recipient line to increase its capacity to send data.

There follows a step 34 of classification of the recipient lines. During this classification step 34, the recipient lines of the first group are classified according to two criteria, the first of which has priority over the second:
 a predetermined level of privilege associated with each line; and
 a value Δ associated with each line, equal to the difference between the capacity to send data and the recipient capacity.

Thus the recipient lines of the first group are first classified in decreasing order of their level of privilege. Then, if a plurality of lines have the same level of privilege, they are classified in increasing order of their value Δ. These lines are ordered in the first group.

This classification defines the order in which the recipient lines of the first group are processed in the remainder of the process. During a step 35, the first recipient line of the first group is selected.

A step 36 verifies whether the second group of lines, called "donor lines", is empty. If it is empty, the process returns to the selection step 32 described above.

There follows a step 37 of selecting one or more sub-bands of the recipient line previously-selected.

For example, the sub-band is selected in accordance with a criterion based on the level of crosstalk coupling between the lines in each sub-band of the selected recipient line. This gives preference to the sub-bands of the recipient line that have a high level of coupling with the other lines.

A normalized signal-to-noise ratio criterion may also be chosen.

In the example described, a plurality of sub-bands is selected, for example the twenty-five sub-bands of the selected recipient line with the highest coupling level or according to their normalized signal-to-noise ratio. Depending on the criterion chosen, the selected sub-bands may themselves be classified.

In the remainder of the process, in order to process the selected recipient line more efficiently:
 the selected sub-bands are grouped into batches, which accelerates processing whilst still addressing accurately the requirements of the recipient lines (a number Nsb of sub-bands per batch is defined);
 each batch of sub-bands is assigned a certain number of donor lines, which number must not exceed a maximum number Nld;
 this assignment is carried out batch by batch and in a plurality of iterations during each of which the same donor line can be assigned to only one batch;
 the assignment of the donor lines to each batch of selected sub-bands of the recipient line may be repeated a maximum number N of times.

There follows a step 38 during which the selected sub-bands are grouped into batches of Nsb sub-bands. If Nsb has the value four, the twenty-five sub-bands are grouped into six batches each containing four sub-bands and one batch containing one sub-band.

A first cycle of assignment of the donor lines to each batch of sub-bands then begins.

To this end, there begins a first iteration, proceeding batch by batch, during which each donor line is assigned to a batch of sub-bands. During an iteration, a maximum number Nld of donor lines may be assigned to the same batch and the same donor line may be assigned to only one batch.

Thus a batch to which the subsequent steps 40 and 42 are applied is selected during a step 39.

The step 40 first of all verifies whether the selected batch is saturated, i.e. if a maximum number of bits per sub-band of the batch has been reached. If so, no donor line is assigned to this batch and another batch of the recipient line is selected for which the step 40 resumes from its beginning. If not, this selected batch is retained. The donor lines are then worked through to determine at most Nld donor lines that can be assigned to the selected batch. A donor line is assigned to this batch of sub-bands if the corresponding sub-bands in the donor line are not already all extinguished and if that donor line has not already been assigned to another batch in the current iteration. All the corresponding sub-bands of the donor line are then extinguished.

There follows the step 42 which measures the new capacity to send data of the selected recipient line. If that capacity is greater than the recipient capacity, that recipient line is considered to have been processed and is eliminated from the first group of recipient lines, and there follows a test step 43.

This step 43 verifies whether there remains at least one recipient line in the first group. If so, a new recipient line is selected and the process returns to the step 36. If not, there follows a step 44 that ends the process.

If the capacity for sending data measured during the step 42 is less than the recipient capacity, another batch of the recipient line is selected and the process returns to the step 40.

The steps 40 and 42 are repeated until no further donor lines can be assigned, for example because they have all been assigned already, or until there remain no further batches to be selected.

If donor lines can no longer be assigned, for example because they have all been assigned once already in the current iteration, the process returns to the step 39 to carry out a new iteration of assignment of donor lines, in addition to the assignments of the preceding iterations.

If there remain no further batches to be selected, there follows a step 45 which verifies whether at least one donor line has been assigned to a batch of sub-bands of the recipient line selected during the last iteration.

If at least one donor line has been assigned to a batch of sub-bands of the selected recipient line, and if the maximum number Nld of recipient lines assigned per batch of sub-bands has not been reached, the process resumes from the step 39, to perform a new iteration of assignment of donor lines.

If not, this indicates either that no donor line includes an unextinguished sub-band corresponding to the selected sub-bands of the recipient line or that the number Nld is reached for all the batches of sub-bands before the recipient line reaches its required minimum capacity.

If the number Nld has been reached for all the batches of sub-bands, the process can return to the step 39 to perform a new cycle of assignment of donor lines to each batch of selected sub-bands of the recipient line. A maximum number N of assignment cycles are preferably carried out, N being a predetermined number beyond which it is considered that further assignment of donor lines will not significantly increase the capacity of the recipient lines.

If the number N is reached, or if no donor line includes an unextinguished sub-band corresponding to the selected sub-bands of the recipient line, the recipient line is extracted from the first group of recipient lines and integrated into an ancillary group of recipient lines whose requirements cannot be satisfied, after which the process resumes at the step 43.

The adjustment method described above is optionally interrupted as soon as a new line becomes a donor line. Under such circumstances, that new line is integrated into the second group of donor lines, the lines of the ancillary group are re-integrated into the first group of recipient lines, and the process resumes at the step 34 of classifying the recipient lines.

Note that if there are no more donor or recipient lines at a given time the process is interrupted and returns to the step 32 of selecting donor and recipient lines.

Figure 2:
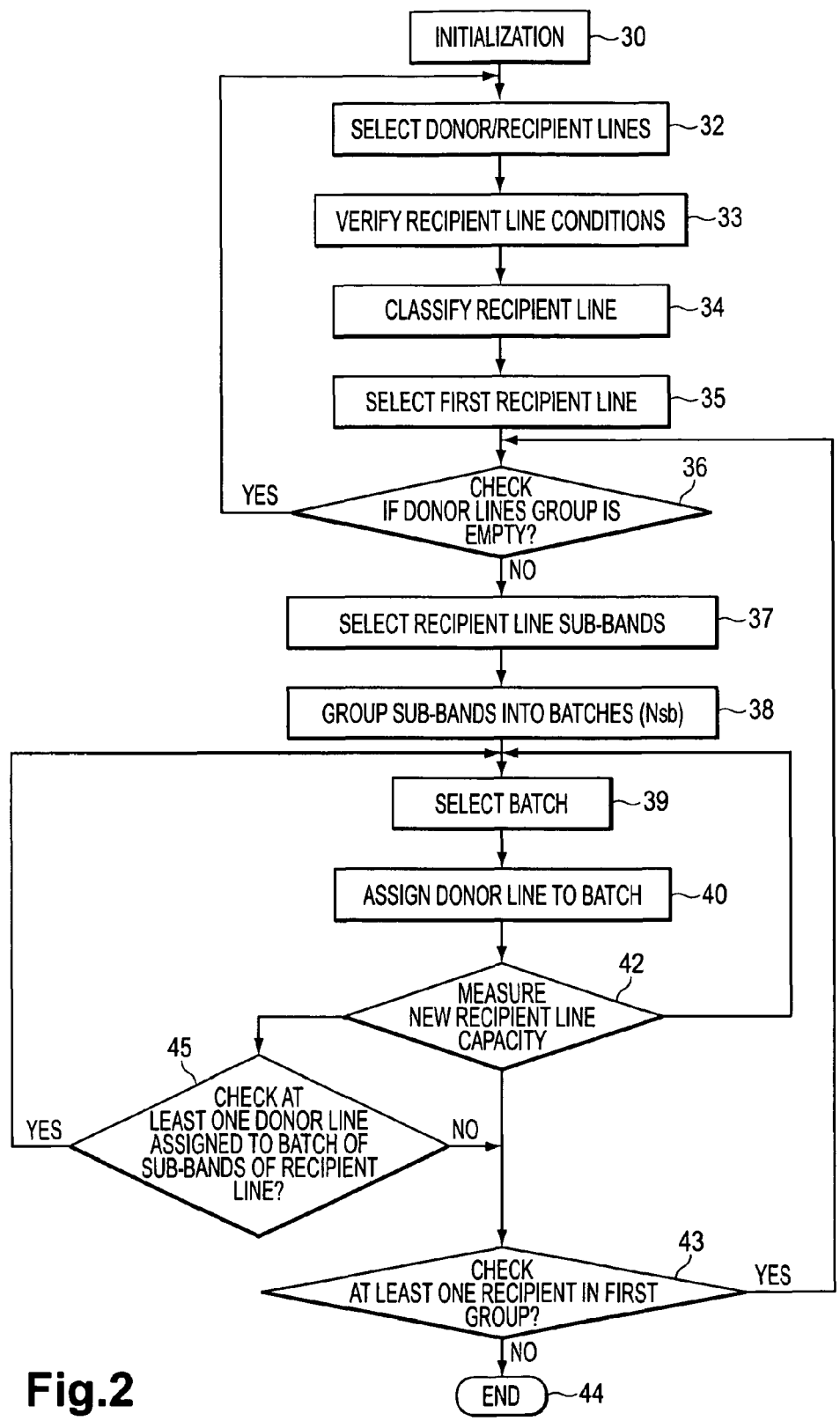
FIG. 2 represents the successive steps of an implementation of a method of the invention for adjusting spectral power densities that is used by the device of FIG. 1.
Figure 3:
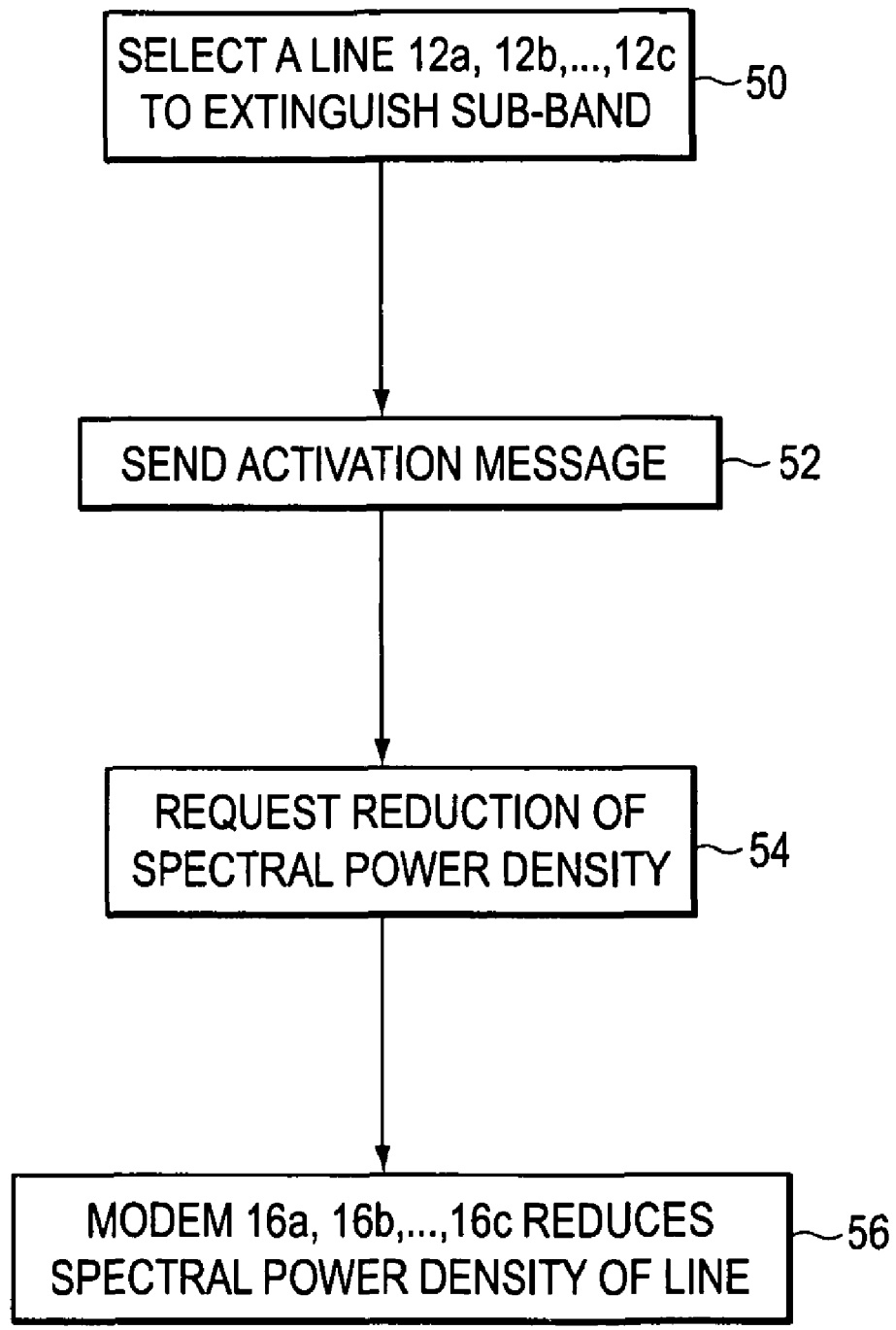
FIG. 3 represents the successive steps of a spectral power density modification method that can be combined with a method of the invention for adjusting spectral power densities.

FIG. 3 represents a power spectral density modification process that can be used in the FIG. 2 method to re-establish the spectral power density level in the sub-bands (step 33) or to extinguish sub-bands (step 40).

A spectral power density modification process is known already in which the data receiver terminal itself automatically initiates modification of the assigned spectral power density as a function of the power received and/or the noise on the line estimated by the receiver terminal.

During this process, the receiver terminal sends the sender terminal a message requesting modification of the spectral power density assigned to at least one selected sub-band.

Because the receiver terminal initiates the modification, it can at any time decode the data sent in each sub-band of frequencies. Thus modifying the spectral density does not generate transmission errors.

Nevertheless, the process described above does not enable the sender terminal to modify the spectral power density arbitrarily, independently of the power received and the noise on the line estimated by the receiver terminal. To remedy this drawback, the power spectral density reduction process represented in FIG. 3 includes the following steps:

the sender terminal (i.e. the sender modem) sends the receiver terminal an activation message; and reception of that activation message by the receiver terminal causes the receiver terminal to send the sender terminal a message requesting reduction of the sending power spectral density in the selected sub-band.

This reduction process starts from the principle that, to change the send spectral power density without generating transmission errors, it is preferable for the change to be initiated by the receiver terminal.

More precisely, during a first step 50, one of the lines 12a, 12b, . . . , 12c for which at least one sub-band is to be extinguished is selected.

There follows a step 52 of sending an activation message in order for the receiver terminal associated with this line to send a message requesting reduction of the sending spectral power density assigned to the sub-bands to be extinguished. The activation message is sent from the sender modem 16a, 16b, . . . , 16c associated with the selected line 12a, 12b, . . . , 12c to the receiver terminal 18a, 18b, . . . , 18c of that line 12a, 12b, . . . , 12c.

The xDSL standards define an overhead control channel on which messages can circulate between the sender modem 16a, 16b, . . . , 16c and the receiver modem 18a, 18b, . . . , 18c. These standards also define the structure of these messages, and in particular the structure of a "vendor specific" message, whose size and content may be chosen at will. Accordingly, the activation message is preferably a "vendor specific" type message sent on the overhead control channel from the sender modem 16a, 16b, . . . , 16c to the receiver terminal 18a, 18b, . . . , 18c.

There follows a step 54 of sending the message requesting reduction of the sending spectral power density assigned to the sub-bands to be extinguished. That reduction request message is sent from the receiver terminal 18a, 18b, . . . , 18c to the sender modem 16a, 16b, . . . , 16c.

The xDSL standards define several types of messages intended to circulate on the overhead control channel and adapted to contain instructions for adjusting the sender modem 16a, 16b, . . . , 16c. One of these messages, called the "fast permutation request" message, is used to adjust the spectral power densities assigned to each sub-band by the sender modem 16a, 16b, . . . , 16c and is sent by the receiver terminal 18a, 18b, . . . , 18c.

The message requesting reduction of the send spectral power density preferably consists in a fast permutation request.

There finally follows a step 56 during which the sender modem 16a, 16b, . . . , 16c reduces the spectral power density of the sub-bands to be extinguished, in accordance with the instructions contained in the message sent by the receiver terminal 18a, 18b, . . . , 18c.

Note that the method described above can be used to re-establish the initial spectral power density level of the sub-bands, for example for the re-establishment of that level effected in the step 33 of the FIG. 2 method. Thus it is possible, under such circumstances to use a new data field in the fast permutation request, said field containing an initial level indicator.

A method according to the invention can be executed at any time, including during use of the lines 12a, 12b, ..., 12c to provide services to which they have a subscription, since the measurements on which the adjustments are based may be made at any time. It can therefore be used to adjust the capacities of the lines in real time.

It is clear that the adjustment method and device described above enable optimum overall management of the capacities to send data of a set of lines.

The invention claimed is:

1. A method of adjusting spectral power densities of a plurality of telecommunications lines sending data in a plurality of frequency sub-bands, a spectral power density being assigned to each sub band of each line sending data, the method comprising:
    selecting at least one of a "recipient line" having a capacity to send data which is less than a predetermined reference capacity identified as the "recipient capacity";
    selecting at least one of a "donor line" having a capacity to send data which is greater than a predetermined reference capacity identified as the "donor capacity";
    selecting at least one sub band of the recipient line in accordance with a predetermined criteria;
    selecting at least one sub band of the donor line, the selection determined by the selection of the sub band of the recipient line;
    reducing the spectral power density assigned to the selected sub band to a predefined minimum power level in the sub band.

2. A spectral power density adjustment method according to claim 1, wherein the predetermined criterion is a level of crosstalk coupling between the lines in each sub band of the selected recipient line.

3. A spectral power density adjustment method according to claim 1, wherein the predetermined criterion is a normalized signal to noise ratio in each sub band of the selected recipient line.

4. A spectral power density adjustment method according to claim 1, wherein the recipient capacity is a minimum bit rate required to provide at least one service to which the recipient line subscribes.

5. A spectral power density adjustment method according to claim 1, wherein the donor capacity is equal to the maximum between a minimum bit rate guaranteed by the operator and the sum of a minimum bit rate required to provide at least one service to which a recipient line subscribes with a predetermined bit rate margin.

6. A spectral power density adjustment method according to claim 1, wherein the capacity to send data is a maximum data bit rate which a line can send with the spectral power density assigned to it, and the recipient capacity is a predetermined reference bit rate.

7. A spectral power density adjustment method according to claim 1, wherein:
    a first group of recipient lines is selected;
    the recipient lines of the selected first group are classified; and
    for at least some of the recipient lines of the selected group, processed in the order of classification:
        a batch comprising at least one sub band of the recipient line is selected in accordance with a predetermined criterion;
        a "batch to be extinguished" comprising at least one sub band of at least one donor line is selected, the selection of the batch of the recipient line determining the selection of the batch to be extinguished;
        for the selected batch of the recipient line, at least one donor line is selected for which the spectral power density assigned to the sub band of the batch to be extinguished is greater than the predetermined level; and
        for each selected donor line, the spectral power density of the sub band of the batch to be extinguished is reduced to the predefined minimum power level in the sub band.

8. A spectral power density adjustment method according to claim 7, wherein at most a predetermined number of donor lines is selected for the selected batch of the recipient line.

9. A spectral power density adjustment method according to claim 1, wherein, before selecting at least one sub band of the recipient line in accordance with a predetermined criterion:
    the following two conditions are verified:
        if the recipient line was a donor line during a preceding execution of the adjustment method; and
        if so, if the spectral power density assigned to at least one sub band was reduced to the predefined minimum power level in the sub band during the previous execution of the adjustment method; and
    if these two conditions are satisfied, the spectral power density in the sub band is re-established at the initial power level before reduction.

10. An adjustment method according to claim 9, wherein, the data being sent by a sender terminal and received by a receiver terminal, to re-establish the spectral power density in the sub band:
    an activation message is sent from the sender terminal to the receiver terminal;
    the reception of the activation message by the receiver terminal causes the receiver terminal to send the sender terminal a message requesting modification of the sent spectral power density in the sub band; and
    the sender terminal re-establishes the spectral power density in the sub band in accordance with the instructions contained in the message sent by the receiver terminal.

11. An adjustment method according to claim 9, wherein, the data being sent by a sender terminal and received by a receiver terminal, the sender terminal re-establishes the spectral power density level without being prompted by the receiver terminal.

12. A device for adjusting spectral power densities of a plurality of telecommunications lines sending data in a plurality of frequency sub-bands, a spectral power density being assigned to each sub band of each line sending data, comprising;
    means for selecting at least one "recipient line" whose capacity for sending data is less than a predetermined reference capacity;
    means for selecting at least one "donor line" whose capacity for sending data is greater than a predetermined reference capacity;
    means for selecting at least one sub band of the recipient line in accordance with a predetermined criterion;
    means for selecting at least one sub band of that the donor line which is determined by the selection of the sub band of the recipient line; and
    means for reducing the spectral power density assigned to the selected sub band of the donor line to a predefined minimum power level in the sub band.

* * * * *

UNITED STATES PATENT AND TRADEMARK OFFICE
CERTIFICATE OF CORRECTION

PATENT NO. : 8,406,317 B2
APPLICATION NO. : 11/664940
DATED : March 26, 2013
INVENTOR(S) : Tlich et al.

Page 1 of 1

It is certified that error appears in the above-identified patent and that said Letters Patent is hereby corrected as shown below:

In the Specification

In column 6 at line 9, Change "previously-selected." to --previously selected.--.

In the Claims

In column 10 at lines 50-51 (approx.), In Claim 12, Change "comprising;" to --comprising:--.

In column 10 at line 59 (approx.), In Claim 12, Change "that the" to --the--.

Signed and Sealed this
Twelfth Day of November, 2013

Teresa Stanek Rea
*Deputy Director of the United States Patent and Trademark Office*